United States Patent
Hough et al.

(10) Patent No.: US 9,944,781 B2
(45) Date of Patent: Apr. 17, 2018

(54) VULCANIZABLE RUBBER COMPOSITION FOR LOW FOGGING ARTICLES

(71) Applicant: LANXESS Elastomers B.V., Geleen (NL)

(72) Inventors: Philip Hough, Grevenbicht (NL); Van Martin Duin, Sittard (NL)

(73) Assignee: LANXESS Deutschland GMBH, Cologne (DE)

( * ) Notice: Subject to any disclaimer, the term of this patent is extended or adjusted under 35 U.S.C. 154(b) by 0 days.

(21) Appl. No.: 15/021,766

(22) PCT Filed: Sep. 19, 2014

(86) PCT No.: PCT/EP2014/070001
§ 371 (c)(1),
(2) Date: Mar. 14, 2016

(87) PCT Pub. No.: WO2015/040163
PCT Pub. Date: Mar. 26, 2015

(65) Prior Publication Data
US 2016/0229998 A1    Aug. 11, 2016

(30) Foreign Application Priority Data
Sep. 19, 2013 (EP) .................................. 13185138

(51) Int. Cl.
| | |
|---|---|
| *C08L 23/16* | (2006.01) |
| *C08J 3/24* | (2006.01) |
| *C08K 3/34* | (2006.01) |
| *B29C 35/02* | (2006.01) |
| *C08L 23/02* | (2006.01) |
| *C08L 67/00* | (2006.01) |
| *C08L 75/00* | (2006.01) |
| *C08L 61/06* | (2006.01) |
| *C08L 61/14* | (2006.01) |

(52) U.S. Cl.
CPC .............. *C08L 23/16* (2013.01); *C08J 3/247* (2013.01); *C08L 23/02* (2013.01); *C08L 67/00* (2013.01); *C08L 75/00* (2013.01); *C08J 2323/16* (2013.01); *C08J 2423/16* (2013.01); *C08J 2461/10* (2013.01); *C08K 3/34* (2013.01); *C08L 61/06* (2013.01); *C08L 61/14* (2013.01); *C08L 2205/02* (2013.01); *C08L 2205/025* (2013.01); *C08L 2205/035* (2013.01); *C08L 2205/06* (2013.01); *C08L 2312/04* (2013.01)

(58) Field of Classification Search
None
See application file for complete search history.

(56) References Cited

U.S. PATENT DOCUMENTS

| | | | |
|---|---|---|---|
| 5,863,857 A | 1/1999 | Lamb et al. | |
| 6,491,992 B1 | 12/2002 | Koizumi et al. | |
| 6,610,768 B1 | 8/2003 | Jelenic et al. | |
| 7,687,559 B2 | 3/2010 | Kim | |
| 2003/0153652 A1 | 8/2003 | Tsujimura et al. | |
| 2005/0014854 A1 | 1/2005 | Carcich | |
| 2012/0225963 A1* | 9/2012 | Duin | C08L 21/00 521/136 |

FOREIGN PATENT DOCUMENTS

| | | |
|---|---|---|
| CN | 102382363 A | 3/2012 |
| JP | 2000239465 A | 9/2000 |
| JP | 2001151923 | 6/2001 |
| JP | 2010150417 A | 7/2010 |
| JP | 201282422 A | 4/2012 |
| KR | 100799082 B1 | 2/2008 |
| WO | 200118074 A1 | 3/2001 |

OTHER PUBLICATIONS

Philip Hough's presentation entitled "New Keltan Grades for Flame Resistant EPDM Compounds" at the SGF Conference in Malmö on Apr. 10 and 11, 2013.*
International Search Report from co-pending Application PCT/EP2014/070001 dated Nov. 18, 2014, 3 pages.

* cited by examiner

*Primary Examiner* — Vu A Nguyen

(57) ABSTRACT

A polymeric composition that provides reduced fogging from low molecular weight, volatile organic materials may include at least a first elastomeric polymer having a Mooney viscosity (ML 1+4) at 125° C.) of least 10 MU, at least a second elastomeric polymer having a Mooney viscosity (ML 1+4) at 125° C.) of less than 10 MU, a phenol formaldehyde resin cross-linker, an activator package, and a VOC absorber.

20 Claims, No Drawings

VULCANIZABLE RUBBER COMPOSITION FOR LOW FOGGING ARTICLES

The present invention relates to a vulcanizable rubber composition, a process for manufacturing vulcanized articles and such obtained vulcanized articles.

BACKGROUND INFORMATION

The term "fogging" as used herein is used to describe the evaporation/sublimation and subsequent condensation/deposition of low molecular weight, volatile organic materials from plastic or elastomer components onto cooler adjacent surfaces, and more particularly, where the condensation of said volatile organic materials forms as a film onto the surface of transparent barriers such as windows and light covers, causing a reduction in transparency, thereby impairing the functional effectiveness of the transparent barrier. This phenomenon is well known within the automotive industry, where both plastic and elastomer based products are commonly found within the enclosed and confined spaces of passenger compartments and behind lamp covers. In these examples, fogging is commonly experienced as an unsightly oily film on the interior surface of the vehicle windows or as reduced light transmission from automotive lamps. In the case of automotive headlights, such fogging could have safety implications for drivers and passengers.

Fogging caused by the condensation of low molecular weight, volatile organic materials should not be confused with fogging caused by the condensation of moisture from air onto the interior surfaces of windows, which, because the moisture can again evaporate when ambient conditions allow.

While very little information is published describing common rubber compounding practices to minimize the risk of fogging, a technologist skilled in the art of rubber formulation design will be aware of compounding measures that can be taken to reduce this effect. Such measures include the use of high molecular weight mineral oil, plasticizers having a low aromatic content or the partial/complete replacement of the mineral oil plasticizer with a polymeric plasticizer such as liquid polybutadiene or polyisobutylene. Complete removal of all plasticizers is a further option, but may lead to processing difficulties, or even be prohibitive for certain low hardness applications. Certain carbon blacks containing higher levels of aromatic amines should also be avoided, while the use of plate structured mineral fillers such as talcum can be beneficial by acting as a barrier to the release of volatile substances. In general any additive having a low molecular weight has the potential to cause fogging and should therefore be used at a low level or more preferably avoided. Examples of such ingredients include many process aids, waxes, stabilizers, anti-oxidants, stearates and stearic acid.

Both unreacted (residual) sulphur vulcanization accelerators and peroxides and their decomposition products may also contribute to fogging, necessitating the use of full cure times, preferably followed by a suitable post cure to evaporate any organic volatile materials from the cured product.

WO01/18074 describes a method whereby the use of a combination of peroxides and specific olefinic copolymers with the further addition of one or more anhydride and/or acid groups shows reduced fogging when compared to a control compound.

JP2001151923 describes a method of lowering the decomposition temperature of azodicarbonamide (ADCA) blowing agent in EPDM sponge using a zinc based foaming aid, thereby avoiding the use of a urea foaming aid that is known to be volatile and can therefore cause fogging. Although sulphur cure is preferred, the patent lists other cure system options such as peroxide and alkylphenol-formaldehyde resins. However, although choosing a blowing agent that may give less fogging due to its different decomposition products it still needs high amounts of normal process oils.

The benefit of zeolite as an odor inhibitor and absorber of volatile organic components (VOC) is well documented. Examples can be found in CN 102382363, where zeolite has been added to polypropylene based compositions to reduce the material smell.

JP 2010150417 further describes a propylene polymer composition containing zeolite and having reduced VOC emission, especially formaldehyde and acetaldehyde.

Further use of zeolite in rubber and plastic compositions is made to absorb moisture, VOC's and odors from the environment around the rubber or plastic product, thereby controlling smell and potential fogging emanating from adjacent components.

US 20050014854 describes sulfur and peroxide cured compositions, or thermoplastic rubbers containing crushed zeolite with a particle size of at least 250 mesh, at addition levels of 1 to 2 times the polymer weight, where the compositions are used to produce odor absorbing shoe liners. Further examples of where the use of zeolite is described as an additive to reduce moisture and VOC's is for the application of insulating glass units.

WO97/49779 describes an absorbent containing non-curing composition where depolymerized butyl rubber is used as a carrier for the absorbent materials, added at levels of 20-50% by weight, of which zeolite is listed as moisture absorbent. This non-curing sealant serves to desiccate the space between the glass panes in the window units.

Along a similar theme, U.S. Pat. No. 6,491,992 B1 describes a thermoplastic elastomer vulcanizate composition preferably containing between 10 to 70 parts of synthetic zeolite moisture absorbent for use as a seal and/or a spacer for insulating glass units.

Examples of the use of zeolite as an additive in curable rubber compositions for the purpose of trapping VOC's formed by the decomposition of accelerators for sulphur curing or organic peroxide curatives can also be found. U.S. Pat. No. 7,687,559 B2 describes a rubber composition for the preparation of rubber rollers, which minimizes the content of VOC's formed when the rubber roller is produced by sulphur cross-linking. While organic peroxide is listed as one potential cure system, the Invention described and the examples given focus only on the use of accelerated sulphur cures. Removal of VOC's generated during the curing process is achieved by the Inclusion of at least one component of an acid anhydride and a zeolite. The zeolite used has an average particle size of about 1-50 μm, and is preferably added to the rubber composition at a level of 5-30 parts by weight based on 100 parts of the base rubber.

Patent EP 2 441 798 A1 describes the addition of an activated zeolite to a curable rubber composition comprising a phenol formaldehyde cure system to increase both the rate of cure and the final cross-link density.

Despite the described improvements attributed to the inclusion of zeolite in sulphur and peroxide cured rubber compositions regarding the reduction of emitted VOC's and a lower capacity to cause fogging, development work carried out by the inventors of this application has shown that, while zeolite does indeed give a measurable improvement to gravimetric fogging of sulphur and peroxide cured solid rubber compositions when measured according to the standard described by DIN 75201B, significant fogging still occurs.

Accordingly, there is a need to develop a curable solid rubber composition showing a significantly lower capacity for causing fogging than can be achieved by the use of zeolite in a rubber composition cured with either sulphur or peroxide cure systems.

SUMMARY

A purpose of the invention is therefore to provide a new vulcanizable rubber composition having a very low capacity for causing fogging after having been vulcanized.

This objective is achieved by providing a vulcanizable composition comprising:
a) an elastomeric polymer having a Mooney viscosity (ML 1+4, at 125° C.) of least 10 MU,
b) a phenol formaldehyde resin cross-linker
c) an activator package
d) a VOC absorber and
e) an elastomeric polymer having a Mooney viscosity (ML 1+4, at 125° C.) of less than 10 MU.

Surprisingly the vulcanized rubber composition according to the invention provided improved fogging results as shown by gravimetric fogging measurements according to DIN 75201, when compared with similar compositions using either sulphur or peroxide cure systems.

DESCRIPTION OF THE EMBODIMENTS

Component a): Elastomeric Polymer

The elastomeric polymer of component a) according to the present invention preferably contains double bond-containing rubbers designated as R rubbers according to DIN/ISO 1629. These rubbers have a double bond in the main chain and might contain double bonds in the side chain in addition to the unsaturated main chain.

They include, for example: Natural rubber (NR), Polyisoprene rubber (IR), Styrene-butadiene rubber (SBR), Polybutadiene rubber (BR), Nitrile rubber (NBR), carboxylated nitrile rubber (XNBR), Butyl rubber (IIR), Brominated isobutylene-isoprene copolymers with bromine contents of 0.1 to 10 wt. % (BIIR), Chlorinated isobutylene-isoprene copolymers with chlorine contents of 0.1 to 10 wt. % (CIIR), Hydrogenated or partially hydrogenated nitrile rubber (HNBR), Styrene-butadiene-acrylonitrile rubber (SNBR), Styrene-isoprene-butadiene rubber (SIBR) and Polychloroprene (CR).

Elastomeric polymer of component a) should also be understood to include rubbers comprising a saturated main chain, which are designated as M rubbers according to ISO 1629 and might contain double bonds in the side chain in addition to the saturated main chain. These include for example ethylene propylene rubber EPDM, chlorinated polyethylene CM, fluorelastomers (FKM), in particular vinylidene fluoride (VDF) and hexafluor propylene (HFF), and chlorosulfonated rubber CSM.

Preferably the elastomeric polymer component a) is selected from the group consisting of NR, IR, SBR, BR, NBR, XNBR, IIR, brominated isobutylene-isoprene copolymers with bromine contents of 0.1 to 10 wt. % (BIIR), chlorinated isobutylene-isoprene copolymers with chlorine contents of 0.1 to 10 wt. % (CIIR), HNBR, SIBR, SNBR, XNBR, EPDM, CM and CSM.

The elastomeric polymer component a) of the above mentioned type in the rubber composition according to the present invention can naturally be modified by further functional groups. In particular, elastomeric polymers that are functionalized by hydroxyl, carboxyl, anhydride, amino, amido and/or epoxy groups are more preferred. Functional groups can be introduced directly during polymerization by means of copolymerization with suitable co-monomers or after polymerization by means of polymer modification.

In a preferred embodiment of the invention, the elastomeric polymer a) comprises 1,1-disubstituted or 1,1,2-trisubstituted carbon-carbon double bonds. Such di- and tri-substituted structures react especially satisfactorily with a phenol formaldehyde resin cross-linker according to the invention.

The rubber composition can comprise a blend of more than one of the above defined elastomeric polymers. In particular component a) contains a combination of at least two EPDMs.

The elastomeric polymer a) is specifically understood not to contain any processing oil. Process oils are normally added during the manufacture of the elastomeric polymer.

Preferred elastomeric polymers of component a) are copolymers of ethylene, one or more $C_3$ to $C_{23}$ α-olefins and a polyene monomer. Copolymers of ethylene, propylene and a polyene monomer are most preferred (EPDM). Other α-olefins suitable to form a copolymer include 1-butene, 1-pentene, 1-hexene, 1-octene and styrene, branched chain α-olefins such as 4-methylbutene-1,5-methylpent-1-ene, 6-methylhept-1-ene, or mixtures of said α-olefins.

The polyene monomer may be selected from non-conjugated dienes and trienes. The copolymerization of diene or triene monomers allows introduction of one or more unsaturated bonds.

The non-conjugated diene monomer preferably has from 5 to 14 carbon atoms. Preferably, the diene monomer is characterized by the presence of a vinyl or norbornene group in its structure and can include cyclic and bicyclo compounds. Representative diene monomers include 1,4-hexadiene, 1,4-cyclohexadiene, 1,5-hexadiene, 1,5-hexadine, 1,6-heptadiene, 1,7-octadiene, dicyclopentadiene, 5-ethylidene-2-norbornene, 5-vinyl-2-norbornene, 5-methylene-2-norbornene, 1,5-heptadiene, and 1,6-octadiene. The copolymer may comprise a mixture of more than one diene monomer. Preferred non-conjugated diene monomers for preparing a copolymer are 1,4-hexadiene (HD), dicyclopentadiene (DCPD), 5-ethylidene-2-norbornene (ENB) and 5-vinyl-2-norbornene (VNB).

The triene monomer will have at least two non-conjugated double bonds, and up to about carbon atoms. Typical triene monomers useful in the copolymer of the invention are 1-isopropylidene-3,4,7,7-tetrahydroindene, 1-isopropylidene-dicyclo-pentadiene, dihydro-isodicyclopentadiene, 2-(2-methylene-4-methyl-3-pentenyl) [2.2.1] bicyclo-5-heptene, 5,9-dimethyl-1,4,8-decatriene, 6,10-dimethyl-1,5,9-undecatriene, 4-ethylidene-6,7-dimethyl-1,6-octadiene, 7-methyl-1,6-octadiene and 3,4,8-trimethyl-1,4,7-nonatriene.

Ethylene-propylene or higher α-olefin copolymers may consist of from about 15 to 80 wt. % ethylene and from about 85 to 20 wt. % $C_3$ to $C_{23}$ α-olefin with the preferred weight ratio being from about 35 to 75 wt. % ethylene and from about 65 to 25 wt. % of a $C_3$ to $C_{23}$ α-olefin, with the more preferred ratio being from 45 to 70 wt. % ethylene and 55 to 30 wt. % $C_3$ to $C_{23}$ α-olefin. The level of polyene-derived units might be 0.01 to 20 wt. %, preferably 0.05 to 15 wt. %, or more preferably 0.1 to 10 wt. %.

Another preferred elastomeric polymer component a) in the present invention is butyl rubber which is the type of synthetic rubber made by copolymerizing an iso-olefin with a minor proportion of a polyene having from 4 to 14 carbon atoms per molecule. The iso-olefins generally have from 4 to 7 carbon atoms and such iso-olefins as isobutylene or ethyl methyl ethylene are preferred. The polyene usually is an aliphatic conjugated diolefin having from 4 to 6 carbon atoms, and is preferably isoprene or butadiene. Other suitable diolefins that may be mentioned are such compounds as piperylene, 2,3-dimethyl butadiene-1,3, 1,2-dimethyl butadiene-1,3, 1,3-dimethyl butadiene-1,3, 1-methyl butadiene-1,3 and 1,4-dimethyl butadiene-1,3. The butyl rubber contains only relatively small amounts of copolymerized diene, typically about 0.5 to 5%, and seldom more than 10%, on the total weight of the elastomer. For the sake of convenience and brevity, the various possible synthetic rubbers within this class will be designated generally by the term butyl rubber.

Further preferred elastomeric polymer in the present invention are especially natural rubber and its synthetic counterpart polyisoprene rubber.

The rubber composition of the present invention should not be understood as being limited to a single elastomeric polymer selected from the above mentioned or preferably described. The rubber composition can comprise a blend of more than one of the above defined elastomeric polymers. Such blends might represent homogeneous or heterogeneous mixtures of polymers where the phenolic resin cross-linker can act in one or more phases as well as act as a compatibilizing agent between the different polymeric phases.

Preferably the elastomeric polymer component a) having a Mooney viscosity (ML 1+4, at 125° C.) in the range of 10 to 120, in particular 20 to 90, preferably 20 to 50 MU.

Component b) Phenol Formaldehyde Resin Cross-Linker

The term phenol formaldehyde resin cross-linker, phenolic resin, resin cross-linker or resol shall have identical meanings within this application and denote a phenol and formaldehyde based condensation product used as rubber curing agent.

Further are the terms cross-linking, curing and vulcanizing used with a singular meaning and are fully interchangeable words in the context of the present application, all expressing the thermosetting or fixation of a polymeric network by generation of covalent bonds between the rubber chains or its pedant groups.

The phenol formaldehyde resin cross-linker of component b) can be present in the composition according to the invention as such, or can be formed in the composition by an in-situ process from phenol and phenol derivatives with aldehydes and aldehyde derivatives. Suitable examples of phenol derivatives include alkylated phenols, cresols, bisphenol A, resorcinol, melamine and formaldehyde, particularly in capped form as paraformaldehyde and as hexamethylene tetramine, as well as higher aldehydes, such as butyraldehyde, benzaldehyde, salicylaldehyde, acrolein, crotonaldehyde, acetaldehyde, glyoxilic acid, glyoxilic esters and glyoxal.

Resols based on alkylated phenol and/or resorcinol and formaldehyde are particularly suitable.

Examples of suitable phenolic resins are octyl-phenol formaldehyde curing resins. Commercial resins of this kind are for example Ribetak R7530E, delivered by Arkema, or SP1045, delivered by SI Group.

Good rubber products are obtained if 0.5-20 parts of a phenolic resin of the component b) are present per 100 parts of elastomeric polymer a). Preferably 1-15 parts, more preferably 2-10 parts of phenolic resin are present.

In another preferred embodiment of the invention the phenol formaldehyde resin b) is halogenated. Such halogenated resin represents the combined functionality of above phenolic resin and halogenated organic compound as described below. Preferred are brominated phenolic resins. A commercial resin of this kind is for example SP1055 (delivered by SI Group).

Component c) Activator Package

The activator package comprises one or more accelerators or catalysts to work in conjunction with the phenolic resin.

The primary function of an accelerator in a rubber composition is to increase the rate of curing. Such agents may also affect the cross-lining density and corresponding physical properties of the vulcanized rubber composition, so that any accelerator additive should tend to improve such properties.

In a preferred embodiment of the invention the activator package c) comprises a metal halide.

The metal halide accelerators of the invention are exemplified by such known acidic halides as tin chloride, zinc chloride, aluminum chloride and, in general, halides of the various metals of group 3 or higher of the periodic system of elements. This class includes, inter alia, ferrous chloride, chromium chloride and nickel chloride, as well as cobalt chloride, manganese chloride and copper chloride. The metal chlorides constitute a preferred class of accelerators in the composition of the invention. However, acceleration is obtainable with metal salts of other halides such as aluminum bromide and stannic iodide. Metal fluorides such as aluminum fluoride can accelerate, although aluminum fluoride is not particularly desirable. Of the metal chlorides, the most preferred are those of tin, zinc and aluminum.

The heavy metal halides are effective independently of the state of oxidation of the metal, and they are even effective if the halide is partially hydrolyzed, or is only a partial halide, as in zinc oxychloride.

In order to improve the preparation of the rubber composition, it is desirable that the metal halide is further coordinated with complexating agents such as water, alcohols and ethers. Such complexated metal halides have improved solubility and dispersability in the rubber compositions. A preferred example is tin dichloride dihydrate. The preferred amount of a metal halides as activator package c) is from 0.25-5.0 parts, preferably 0.5 to 2 parts per 100 parts of elastomeric polymer a).

In another preferred embodiment of the invention the activator package c) comprises a halogenated organic compound.

Suitable halogenated organic compounds are those compounds from which hydrogen halide is split off in the presence of a metal compound.

Halogenated organic compounds include, for example, polymers or copolymers of vinyl chloride and/or vinylidene chloride other polymerizable compounds, halogen containing plastics, for example polychloroprene; halogenated, for example chlorinated or brominated butyl rubber; halogenated or chlorosulphonated products of high-density or low-density polyethylene or higher polyolefins; colloidal mixtures of polyvinyl chloride with an acrylonitrile-butadiene copolymer; halogenated hydrocarbons containing halogen atoms which may be split off or which may split off hydrogen halide, for example liquid or solid chlorination products of paraffinic hydrocarbons of natural or synthetic origin; halogen containing factice, chlorinated acetic acids; acid halides, for example lauroyl, oleyl, stearyl or benzoyl chlorides or bromides, or compounds such as for example N-bromosuccinimide or N-bromo-phthalimide.

The preferred amount of a halogenated organic compounds as activator package c) is from 0.5-10.0 parts, preferably 2 to 5 parts per 100 parts of elastomeric polymer a).

In one embodiment of the invention the activator package c) further comprises a heavy metal oxide. In the context of the present invention a heavy metal is considered to be a metal with an atomic weight of at least 46 g/mol. Preferably the heavy metal oxide is zinc oxide, lead oxide or stannous oxide.

Such heavy metal oxide is recognized to be especially useful in combination with the above mentioned halogenated organic compound and/or halogenated phenolic resin. A further advantage described in the experiments of the present application is the moderation of the cure rate, e.g. scorch retardance, and the stabilization of the vulcanized compounds against thermal aging.

An advantage of the heavy metal oxide in the composition according to the present invention is an improved heat aging performance of the vulcanized rubber composition reflected by the retention of tensile properties after heat aging.

Good results are obtained with from 0.5-10.0 parts of heavy metal oxide per 100 parts of elastomeric polymer a). Preferably with 0.5-5.0, more preferably with 1-2 parts of heavy metal oxide. It is important to use a sufficient amount of heavy metal oxide, so to achieve an acceptable scorch time and good thermal stability of the vulcanized compound. If too much heavy metal oxide is used the cure rate will substantially deteriorate.

Preferably the activator package c) is present in the rubber composition in an amount of 0.25-10.0 parts, preferably 0.25 to 5 parts per 100 parts of elastomeric polymer a).

Component d) VOC Absorber

The VOC absorber d) of the present application may be molecular sieves such as natural zeolite (e.g. chabasite, gumerinite, levynite, erinite, mordenite and analcite), silica gel, silica-magnesia gel, silica-alumina gel, activated carbon and/or activated alumina. Preferably the VOC absorber d) is a zeolite, and more preferably, but not limited to, a zeolite 5A having a moisture content of less than 1.5 wt %. A powdered zeolite grade is in particular preferred with a particle size of less than 50 micrometer, as this will be beneficial for optimum dispersion, surface quality of extrudates and physical properties of the cured rubber composite. Such a zeolite is for instance typified by Molsiv 5A Powder as commercially supplied by UOP. Such a low moisture content of the zeolite when added to the rubber composition during mixing is preferred.

Accidental absorption of moisture and/or VOC's will take place if the VOC absorbent d), in particular zeolite is exposed to an environment contaminated with moisture and/or other compounds. It should be recognized that unintended reduction of functionality by moisture is difficult to avoid in a rubber processing environment where the composition of the present invention is mainly used and, in consequence, a significant loss of functionality the zeolite especially by moisture is considered to fall under the scope of the present invention. Such loss of functionality of the zeolite comprised in the composition according to the invention by moisture absorption might reach levels of 75%, preferably less than 50%, more preferably less than 25% of the maximum loss of functionality due to moisture uptake under ambient conditions. Whereas loss of functionality due to moisture uptake might be tolerated to a large extent, the loading of the VOC absorbent d), in particular the zeolite comprised in the composition of the present invention by compounds other than water is less than 5 wt %, preferably less than 3 wt %, more preferably less than 1 wt % compared to the zeolite in its original as received condition.

Adsorption by the VOC absorbent d), in particular the zeolite of compounds other than water is believed to negatively impact the contemplated effect of the present invention, being an absorber of VOC's from the rubber composition, due to a reduction of absorption capacity of the zeolite combined with the potential contamination of the composition by the degassing of compounds, from which water is obviously least detrimental.

It is an aspect of the present invention that when the VOC absorbent d), in particular the zeolite functionality is accidentally lost with respect to its ability to absorb moisture and/or VOC's due to exposure to environmental conditions, such useful functionality may be recovered by drying the zeolite before use. Drying should preferably, but not exclusively be carried out at a reduced pressure and at a temperature that is high enough to cause volatilization of moisture and contaminants from the VOC absorbent d), in particular the zeolite, for example greater than 100° C., preferably greater than 150° C. or more preferably greater than 190° C.

The preferred VOC absorbent d), the zeolites of the present invention are preferably those natural and synthetic crystalline alumina-silicate microporous materials having a three-dimensional porous structure. These zeolites are clearly distinguishable by their chemical composition and crystalline structure as determined by X-ray diffraction patterns.

Due to the presence of alumina, zeolites exhibit a negatively charged framework, which is counter-balanced by positive cations. These cations can be exchanged affecting pore size and adsorption characteristics. Examples are the potassium, sodium and calcium forms of zeolite A types having pore openings of approximately 3, 4 and 5 Ångstrom, respectively. Consequently they are called Zeolite 3A, 4A and 5A. The metal cation might also be ion exchanged with protons. Preferably Zeolite 5A is used.

Further not limiting examples of synthetic zeolites are the zeolite X and zeolite Y. Not limiting examples for naturally occurring zeolites are mordenite, faujasite and erionite.

The VOC absorbent d), in particular the zeolite might be added to the composition in form of fine powders or as aggregated dispersible particles.

To achieve the good dispersion of the VOC absorbent d), in particular the zeolite, it preferably is in the form of fine, small, dispersible particles that might be aggregated into larger agglomerates or processed into pellets. Generally the dispersed particle size is in the range of 1-100 µm and more preferably the zeolite has a particle size below 50 µm. This results in a large number of well dispersed sites within the rubber composition providing the highest effect in absorbing moisture and VOC's from the rubber composition, and will not negatively affect surface quality of the shaped and vulcanized article.

The amount of the VOC absorbent d), in particular the zeolite used in the vulcanizable rubber composition according to the invention depends on the required moisture and VOC absorbency from the rubber composition of the invention, but also on the type of the VOC absorbent d), in particular the zeolite used, its pore size and level of functionality. Preferably the level of the VOC absorbent d), in particular the zeolite is in the range of 0.1 to 20 part per hundred rubber, more preferably between 0.5 and 15 phr and most preferred between 1 and 10 phr.

Component e) Low Viscosity Elastomeric Polymer

The polymeric elastomer of compound e) has a Mooney viscosities (ML1+4) at 125° C. of less than 10 MU, in particular less than 8 MU, most preferably less than 5 MU. Preferably the polymeric elastomer of compound e) has an average weight molecular weight Mw of less than 150.000 g/mol, in particular from 5.000 to 80.000 g/mol, most preferred from 40.000 to 80.000 g/mol.

Such low molecular weight polymer may contain unsaturation, allowing them to vulcanize as part of the cured polymer network, or be fully saturated, in which case they lie trapped by molecular entanglements within the vulcanized rubber composition.

A preferred elastomeric polymer of component e) is selected from the group consisting of polybutadiene, polyisobutene, styrene butadiene rubber, ethylene propylene copolymer (EPM), ethylene propylene diene copolymer (EPDM), butyl rubber and natural or synthetic polyisoprene.

An example of a fully saturated low viscosity polymeric plasticizer is Keltan 0500R as supplied by Lanxess, which is an ethylene propylene copolymer having a Mooney viscosity of approximately 2.5 MU. An example of a commercially available unsaturated low viscosity polymeric plasticizer is Trilene 86 Liquid Polymer, which is an EPDM having 4.5 wt % ENB unsaturation. This is a liquid polymer with a viscosity that is too low to be measured by Mooney viscometer, but having a typical Brookfield Viscosity value of 640,000 cps at 60° C.

Also, the use of functionalized, low viscosity polymeric plasticizes may optionally be used, such as functionalization by maleic anhydride, where the functionalization may be considered to give benefits, for example, improved capture of VOC's and improved bonding to other substrates. At least one example of such a functionalized low viscosity polymeric plasticizer is Polyvest MA from Evonic, which is a maleic anhydride functionalized polybutatiene. The amount of polymeric elastomer e), preferably is in the range 0.1 to 100 parts per 100 parts of the polymeric elastomer of compound a), in particular 5 to 50 parts.

Further Ingredients

The vulcanizable rubber composition as of the present invention preferably is solid at 20° C.

Also a preferred embodiment is the vulcanizable rubber composition that contains azodicorbonamid (ADCA) of less than 1 part per 100 parts of the polymeric elastomer of compound a), in particular less than 0.1, preferably less than 0.01 per 100 parts of the polymeric elastomer of compound a).

In an alternatively preferred embodiment the vulcanizable rubber composition contains foaming agents of less than 1 part per 100 parts of the polymeric elastomer of compound a), in particular less than 0.1, preferably less than 0.01 per 100 parts of the polymeric elastomer of compound a).

The vulcanizable rubber composition as of the present invention may further comprise processing aids, fillers, softening agents other than the polymeric elastomer of compound e), other cross-linker than component b), stabilizers, further polymers, or other auxiliaries or a combination thereof.

The processing aids include, for example, stearic acid and its derivatives. These processing aids may be used alone or in combination of two or more kinds. The preferred amount of the processing aid is in the range of, 0.1 to 20 phr, preferably 1 to 10 phr.

The fillers include, for example, carbon black, carbon nano tubes, inorganic fillers, such as calcium carbonate, magnesium carbonate, calcium hydroxide, magnesium hydroxide, aluminium hydroxide, silicic acid and salts thereof, clay, nano days, talc, mica powder, bentonite, silica, alumina, aluminium silicate, acetylene black, and aluminium powder; organic fillers, such as cork, cellulose and other known fillers. These filers may be used alone or in combination of two or more kinds. The amount of the filler preferably is in the range of 10 to 300 phr, preferably 25 to 200 phr, or more preferably 100 to 200 phr. For the avoidance of doubt any filler used will differ from the VOC absorbent of component d).

The softening agents other than the polymeric elastomer of compound e) include petroleum oils (e.g. paraffin-based process oil (paraffin oil, etc.), naphthene-based process oil, drying oils or animal and vegetable oils (e.g. linseed oil, etc.), aromatic process oil, etc.), asphalt, low molecular weight polymers, organic acid esters (e.g. phthalic ester (e.g. di-2-octyl phthalate (DOP), dibutyl phthalate (DBP)), phosphate, higher fatty acid ester, alkyl sulfonate ester, etc.), and thickeners. Preferably petroleum oils, or more preferably paraffin-based process oil is used. These softening agents may be used alone or in combination of two or more kinds. Preferably the vulcanizable rubber composition of the present invention has an amount of softening agents other than the polymeric elastomer of compound e) in the range of 0 to 10 parts per hundred parts of elastomeric polymer a), in particular in the range of 0 to 5 parts per hundred parts of rubber most preferred from 0 to 2 parts per hundred parts of the polymeric elastomer of compound a).

The vulcanizable rubber composition of the present invention may further comprise one cross-linking agent different from the phenol formaldehyde resin b). A cross-linking agent different from the phenol formaldehyde resin b) may include, for example, sulfur, sulfur compounds e.g. 4,4'-dithiomorpholine; organic peroxides e.g. dicumyl peroxide; nitroso compounds e.g. p-dinitrosobenzene, bisazides and polyhydrosilanes. One or more cross-linking accelerators and/or coagents can be present to assist the cross-linking agents. Preferred are sulfur in combination with accelerators or organic peroxides in combination with coagents.

The presence of further cross-linking agents may result in an improved state of cure of the rubber compound and improved vulcanized polymer properties. Such improvement may originate from a synergistic effect of the cross-linking agents, a dual network formation by each individual cross-linking agent or improvement of cure compatibility of a rubber phase in the case of a rubber blend.

The amount of such an additional cross-linking agent is preferably covered by the range given for the cross-linker of the component b) as a total amount of cross-linking agents.

The possible stabilizers include fire retardant, anti-aging agent, heat stabilizer, antioxidant and anti-ozonant. These stabilizers may be present alone or in combination of two or more kinds. The amount of the stabilizer is preferably in the range of 0.5 to 20 parts per 100 parts of the polymeric elastomer of compound a), preferably 1 to 5 phr.

Further, depending on the purpose and application, the elastomeric composition can contain further auxiliaries like waxes, tackifiers, desiccants, di-phenyloxi-4,4-disulphonyl-hydrazide (OBSH) and/or p-toluene sulphonyl hydrazine (TSH) as foaming agents, adhesives and coloring agents within the range of not affecting the excellent effect of the VOC absorbent d). The amount of further auxiliaries is preferably in the range of 0.5 to 20 per 100 parts of the polymeric elastomer of compound a), preferably 2 to 5 phr.

The rubber composition according to the invention may also comprise polymers other than the above described elastomeric polymer a) and e). Such polymers other than the elastomeric polymer include, polyethylene, polypropylene, acrylic polymer (e.g. poly(meta)acrylic acid alkyl ester, etc.), polyvinyl chloride, ethylene-vinyl acetate copolymers, polyvinyl acetate, polyamide, polyester, chlorinated polyethylene, urethane polymers, styrene polymers, silicone polymers, and epoxy resins.

These polymers other than the elastomeric polymer a) and e) may be present alone or in combination of two or more kinds. The ratio of the polymer other than the elastomeric polymer a) to the elastomeric polymer a) can be 1.0 or less, preferably 0.66 or less.

Process for the Rubber Composition

The vulcanizable rubber composition according to the present invention can be prepared in the form of admixture by properly mixing above-mentioned components and optionally kneading the mixture. In a preferred embodiment, the mixing process is performed in an internal mixer, in an extruder or on a mill.

During the kneading, the mixture may also be heated. Preferably, mixing is performed by first kneading components other than additive components to be added in small amounts, such as, for example, cross-linking agents, curing package, and then adding these additive components to the kneaded mixture. Whereas the addition of the additive components can be done on the same mixing equipment. Preferably the coding of the pre-mix and addition of additive components is easily performed on a second mixing device such as a 2-roll mill. Such use of a second mixing device is advantageous considering that the additive components are often heat sensitive and can thus be mixed to the composition at a lower temperature.

The vulcanizable rubber composition prepared according to the invention can be recovered from the mixing process in bulk or shaped in the form of sheets, slabs or pellets.

Vulcanization Process

The present invention also relates to a process for the manufacture of a vulcanized article comprising the steps of shaping the vulcanizable rubber composition and vulcanizing the shaped rubber composition.

The shaping of the elastomeric composition can take place preferably after the preparation of the vulcanizable rubber composition prepared according to the invention, as an Individual shaping step, ahead the vulcanization process or during the vulcanization process.

In a preferred embodiment, the shaping of the vulcanizable rubber composition is performed by extrusion, calendaring, compression molding, transfer molding or injection molding.

The vulcanizable rubber composition thus prepared is heated to a temperature at which the curing process takes place, so that a cross-linked rubber composition is obtained.

In a preferred embodiment the curing of the vulcanizable rubber composition is performed in a steam autoclave, an infrared heater tunnel, a microwave tunnel, a hot air tunnel, a salt bath, a fluidized bed, a mold or any combination thereof.

An advantage of the present invention is that the vulcanization time of the vulcanizable rubber composition comprising a phenol formaldehyde resin cross-linker is between 5 seconds and 30 minutes and the vulcanization temperature is in the range between 120 and 250° C. More preferably the vulcanization time is between 15 seconds and 15 minutes and the vulcanization temperature is in the range between 140 and 240° C. Most preferably the vulcanization time is between 1 and 10 minutes and the vulcanization temperature is in the range between 160 and 220° C.

The curing processes can be performed in any equipment that is known and suitable for curing of a vulcanizable rubber composition. This can be done either in a static process, as well as in a dynamic process. In the first case, mention can be made to curing in a predetermined shape, or thermoforming, by the use of a heated shape. Optionally, the cured composition is subjected to a post cure treatment that further extends the vulcanization time.

Preferably, the dynamic process comprises mixing of a thermoplastic and a rubber, while simultaneously crosslinking selectively the rubber phase. Preferred equipment to perform this so-called dynamic vulcanization are twin-screw extruders and batch mixers.

The method for curing the vulcanizable rubber composition is not particularly limited to the above processes. Alternatively the composition can be shaped into a sheet using a calendar, or the like, and then be cured in a steam autoclave. Alternatively, the rubber composition can be formed into a complex shape, such as an uneven shape, by injection molding, press forming, or other forming method, and then be cured.

A particular advantage of the present invention is that a pressure-less cure can be applied to the vulcanizable rubber composition of the present invention. Such pressure-less cure is often characterized by an unwanted liberation of gasses during the curing process resulting in porosity within the cured article and surface defects. The vulcanized rubber compounds of the present invention are characterized by low porosity and good surface quality.

A particular advantage of the present invention concerns the rubber composition where the elastomeric polymer is an EPDM. EPDM compositions are commonly cross-linked by sulfur or peroxide. The use of phenolic resins provides the advantages of resin cure to EPDM compositions, namely good high temperature resistance of the vulcanizate at a level more normally observed for a peroxide cure, but with oxygen inertness during the curing process, i.e. no sticky surface as encountered for peroxide curing.

The invention also relates to a vulcanized article, prepared by the process according to the present invention. Characteristics of a vulcanized article according to the present invention are low compression sets at both low (−25° C.) and high (150° C.) temperatures and high tensile strength. Another characteristic is the good heat aging stability of the vulcanized material expressed by only limited deterioration of the tensile properties upon prolonged temperature treatment.

Preferably the vulcanized article has a density of 0.05 to 3.0 g/cm$^3$ in particular from 0.86 to 3 g/cm$^3$. If the vulcanized article is a foamed article like sponge, the vulcanized article has a density of 0.05 to 0.85 g/cm$^3$.

A particular advantage of the present invention is that the vulcanized article of the present invention show less than 10 mg, in particular less than 7 mg, preferably less than 5 mg fogging measured on a circular test piece having a diameter of 80 mm according to the gravimetric DIN 75201B.

Typical applications for a vulcanized article according to the present invention are in the automotive segment, e.g. window seals, light seals, sealing profiles, brake pedal covers, in the building and construction segment, e.g. seals building profiles and rubber sheeting and in general rubber goods, e.g. conveyor belts, rollers, thermoplastic vulcanization (TPV), chemical linings and textile reinforced flexible fabrications.

EXAMPLES GENERAL PROCEDURE

The compositions of examples and comparative experiments were prepared using an internal mixer with a 3 liter capacity (Shaw K1 Mark IV Intermix) having intermeshing rotor blades and with a starting temperature of 25° C. The elastomeric polymer(s) a) and elastomeric polymer(s) e) were first introduced to the mixer and allowed to blend for a period of 30 seconds before the fillers carbon black and white filler, VOC absorber d) and other ingredients were added. Mixing was allowed to proceed until a mix temperature of 70° C. was achieved, when the remaining ingredients were added. Mixing was allowed to proceed until a mix temperature of 95° C. was achieved, when the batches were transferred to a two-roll mill (Troester WNU 2) for cooling, and blending to achieve a high level of ingredient dispersion.

Analysis of cure rheology was carried out using a moving die rheometer (MDR2000E from Alpha Technologies) with test conditions of 20 minutes at 180° C. The cure characteristics are expressed in ML, MH, ΔS (=MH−ML), ts2 and t'c(90), according to ISO 6502:1999.

Test pieces were prepared by curing at 180° C. using a curing time equivalent to twice t'c90 as determined by MDR rheology testing.

The test pieces were used to determine physical properties reported in the tables.

Duplicate test pieces were sent to an independent, accredited laboratory for testing of gravimetric fogging according to DIN 75201B.

If not mentioned otherwise, the standard procedures and test conditions were used for Hardness (ISO 7619-1:2004), Tensile strength (ISO 37:2005 via dumb-bell type 2), Tear strength (ISO 34-1:2010), Hot air aging (ISO 188:2007), Compression set (ISO 815-1:2008) and Mooney (ISO 289-1:2005).

Compositions and results of example and comparative experiments are given in tables 1 and 2.

Comparative experiment A shows the gravimetric fogging level of a sulphur cured composition, formulated to give low fogging by the elimination of potentially volatile processing aids such as a hydrocarbon mineral oil, but instead using a low molecular weight polymeric plasticizer (KELTAN 0500R: ethylene propylene copolymer from Lanxess having a Mooney viscosity (ML 1+4, at 125° C.) of approximately 2.5 MU). Comparative experiment B is also a sulphur cured composition comparable with comparative experiment A, except that it has the addition of zeolite 5A, which has reduced the fogging level by more than 50%. Comparative experiment C indicates a further improvement to the fogging result by the use of a peroxide cure with zeolite, showing now a 67% improvement to fogging when compared with comparative experiment A. It should be noted that adjustments have been made to the filler levels to compensate for the ability of the KELTAN 0500R to become part of the cured polymer network, making it part of the 100 phr of curable polymer in the composition. Example 1 shows the very low fogging result obtained by a phenol resin cured composition representative of the present invention, being less than 50% of comparative experiment C, and less than 15% when compared to comparative experiment A

TABLE 1

| | Example/Comparative Experiment | | | |
|---|---|---|---|---|
| | Comp. Exp. A | Comp. Exp. B | Comp. Exp. C | Example 1 |
| EPDM KELTAN 2650 | 30 | 30 | 27 | 30 |
| EPDM KELTAN 2470L | 70 | 70 | 63 | 70 |
| EPDM KELTAN 0500R | 10 | 10 | 10 | 10 |

TABLE 1-continued

| | Example/Comparative Experiment | | | |
|---|---|---|---|---|
| | Comp. Exp. A | Comp. Exp. B | Comp. Exp. C | Example 1 |
| Carbon black | 35 | 35 | 32 | 35 |
| Whire filler | 20 | 20 | 18 | 20 |
| Zeolit 5A | | 10 | 10 | 10 |
| ZnO | 5 | 5 | | |
| Stearic acid | 1 | 1 | | 1 |
| Peroxide | | | 3.6 | |
| Peroxide-cure package | | | 2.8 | |
| S-Cure package | 5 | 5 | | |
| Sulfur | 2.5 | 2.5 | | |
| Resin SP-1045 | | | | 5 |
| SnCl2·2H2O | | | | 0.8 |
| Total lab phr | 178.5 | 188.5 | 166.4 | 181.8 |

Keltan 2470L: a ethylene-propylene-diene rubber (EPDM), with ethylidene norbornene (ENB) as diene, having a Mooney viscosity (ML 1 + 4, at 125° C.) of 22 MU, an ethylene content of 69 wt % and an ENB content of 4.2 wt %. Keltan 2650: amorphous ethylene-propylene-diene rubber (EPDM), with ethylidene norbornene (ENB) as diene, having a Mooney viscosity (ML 1 + 4, at 125° C.) of 25 MU, an ethylene content of 53 wt % and an ENB content of 6.0 wt %.
Keltan 0500R: ethylenepropylene copolymer from Lanxess having a Mooney viscosity (ML 1 + 4, at 125° C.) of approximately 2.5 MU.
Resin SP1045: a heat reactive octylphenol-formaldehyd resin which contains methylol groups from Schenectady International

TABLE 2

| Properties | Units | Comp. A | Comp. B | Comp. C | Example 1 |
|---|---|---|---|---|---|
| Fogging - Gravimetric DIN 75201 B | [mg][1] | 24.2 | 10.68 | 7.87 | 3.68 |

[1]per circular test piece having a diameter of 80 mm.

What is claimed is:

1. A vulcanizable rubber composition for producing a vulcanized rubber having reduced fogging, the composition comprising:
   a) an elastomeric polymer having a Mooney viscosity ((ML 1+4) at 125° C.) of at least 10 MU;
   b) a phenol formaldehyde resin cross-linker;
   c) an activator package;
   d) a zeolite configured for sorbing volatile organic compounds (VOC); and
   e) an elastomeric polymer having a Mooney viscosity ((ML 1+4) at 125° C.) of less than 10 MU,
   wherein, after vulcanization, the rubber has less than 10 mg fogging determined according to the gravimetric DIN 75201B.

2. The vulcanizable rubber composition according to claim 1, wherein the elastomeric polymer a) is selected from the group consisting of natural rubber (NR), polyisoprene rubber (IR), styrene-butadiene rubber (SBR), polybutadiene rubber (BR), nitrile rubber (NBR), carboxylated nitrite rubber (XNBR), butyl rubber (HIR), brominated isobutylene-Isoprene copolymers with bromine contents of 0.1 to 10 wt. % (BIIR), chlorinated isobutylene-Isoprene copolymers with chlorine contents of 0.1 to 10 wt. % (CIIR), hydrogenated or partially hydrogenated nitrile rubber (HNBR), styrene-Isoprene-butadiene rubber (SIBR), styrene-butadiene-acrylonitrile rubber (SNBR), ethylene propylene rubber (EPDM), chlorinated polyethylene (CM) and chlorosulfonated rubber (CSM).

3. The vulcanizable rubber composition according to claim 1, wherein the elastomeric polymer a) has a Mooney viscosity ((ML 1+4) at 125° C.) of 10 to 120 MU, and the composition does not include volatile hydrocarbon oils as processing aids.

4. The vulcanizable rubber composition according to the claim 1, wherein the elastomeric polymer a) comprises 1,1-disubstituted or 1,1,2-trisubstituted carbon-carbon double bonds.

5. The vulcanizable rubber composition according to claim 1, wherein the phenol formaldehyde resin cross-linker is halogenated.

6. The vulcanizable rubber composition according to claim 1, wherein the activator package c) comprises at least one of a metal halide and a halogenated organic compound.

7. The vulcanizable rubber composition according to claim 1, wherein the zeolite comprises a zeolite 5A having a moisture content of less than 1.5 wt %.

8. The vulcanizable rubber composition according to claim 1, wherein the elastomeric polymer e) is selected from the group consisting of polybutadiene, polyisobutene, styrene butadiene rubber, ethylene propylene copolymer (EPM), ethylene propylene diene copolymer (EPDM), butyl rubber and natural or synthetic polyisoprene.

9. The vulcanizable rubber composition according to claim 1, wherein the elastomeric polymer e) has a Mooney viscosity ((ML 1+4) at 125° C.) of less than 8 MU.

10. The vulcanizable rubber composition according to claim 1, wherein the vulcanizable rubber composition comprises less than 1 part azodicorbonamid (ADCA) per 100 parts of the polymeric elastomer of compound a).

11. The vulcanizable rubber composition according to claim 1, further comprising at least one of processing aids, fillers, softening agents other than the polymeric elastomer of compound e), additional cross-linkers other than component b), stabilizers, further polymers, and other auxiliaries.

12. The vulcanizable rubber composition according to claim 1, further comprising at least one additional polymer other than the elastomeric polymers a) and e), wherein the at least one additional polymer is selected from the group consisting of polyethylene, polypropylene, acrylic polymer, polyvinyl chloride, ethylene-vinyl acetate copolymers, polyvinyl acetate, polyamide, polyester, chlorinated polyethylene, urethane polymers, styrene polymers, silicone polymers, and epoxy resins.

13. A process for reducing release of volatile organic compounds (fogging) from a vulcanized rubber, the process comprising:
    forming a vulcanizable rubber from a vulcanizable rubber composition according to claim 1, using the elastomeric polymer having a Mooney viscosity ((ML 1+4) at 125° C.) of less than 10 MU instead of volatile hydrocarbon oils as processing aids; and
    vulcanizing the rubber to produce a vulcanized rubber having less than 10 ma fogging determined according to the gravimetric DIN 75201B.

14. The process according to claim 13, wherein the forming comprises mixing and a shaping process comprising extrusion, calendaring, compression molding, transfer molding, transfer molding, injection molding or combination thereof.

15. The process according to claim 14, wherein:
    the elastomeric polymer a) has a Mooney viscosity ((ML 1+4) at 125° C.) of 20 to 90 MU and is selected from the group consisting of natural rubber (NR), polyisoprene rubber (IR), styrene-butadiene rubber (SBR), polybutadiene rubber (BR), nitrile rubber (NBR), carboxylated nitrile rubber (XNBR), butyl rubber (IIR), brominated isobutylene-isoprene copolymers with bromine contents of 0.1 to 10 wt. % (BIIR), chlorinated isobutylene-isoprene copolymers with chlorine contents of 0.1 to 10 wt. % (CIIR), hydrogenated or Partially hydrogenated nitrile rubber (HNBR), styrene-isoprene-butadiene rubber (SIBR), styrene-butadiene-acrylonitrile rubber (SNBR), ethylene propylene rubber (EPDM), chlorinated polyethylene (CM) and chlorosulfonated rubber (CSM);
    the phenol formaldehyde resin cross-linker b) is halogenated;
    the activator package c) comprises at least one of a metal halide, a halogenated organic compound, and a heavy metal oxide;
    the zeolite d) comprises potassium, sodium, and/or calcium forms of zeolite A types having pore openings of 3-5 Ångstrom; and
    the elastomeric polymer e) has a Mooney viscosity ((ML 1+4) at 125° C.) of less than 5 MU and is selected from the group consisting of polybutadiene, polyisobutene, styrene butadiene rubber, ethylene propylene copolymer (EPM), ethylene propylene diene copolymer (EPDM), butyl rubber and natural or synthetic polyisoprene; and
    the vulcanizing comprises curing the rubber for 5 seconds to 30 minutes at a vulcanization temperature of 120 to 250° C.

16. A vulcanized article produced by the process according to claim 15, and having less than 10 mg fogging determined according to the gravimetric DIN 75201B.

17. The vulcanizable rubber composition according to claim 1, wherein:
    the elastomeric polymer a) is selected from the group consisting of natural rubber (NR), polyisoprene rubber (IR), styrene-butadiene rubber (SBR), polybutadiene rubber (BR), nitrile rubber (NBR), carboxylated nitrile rubber (XNBR), butyl rubber (IIR), brominated isobutylene-isoprene copolymers with bromine contents of 0.1 to 10 wt. % (BIIR), chlorinated isobutylene-isoprene copolymers with chlorine contents of 0.1 to 10 wt. % (CIIR), hydrogenated or partially hydrogenated nitrile rubber (HNBR), styrene-Isoprene-butadiene rubber (SIBR), styrene-butadiene-acrylonitrile rubber (SNBR), ethylene propylene rubber (EPDM), chlorinated polyethylene (CM) and chlorosulfonated rubber (CSM);
    the phenol formaldehyde resin cross-linker b) is halogenated;
    the activator package c) comprises at least one of a metal halide, a halogenated organic compound, and a heavy metal oxide;
    the zeolite d) comprises potassium, sodium, and/or calcium forms of zeolite A types having pore openings of 3-5 Ångstrom; and
    the elastomeric polymer e) is selected from the group consisting of polybutadiene, polyisobutene, styrene butadiene rubber, ethylene propylene copolymer (EPM), ethylene propylene diene copolymer (EPDM), butyl rubber and natural or synthetic polyisoprene.

18. The vulcanizable rubber composition according to claim 17, wherein:
    the elastomeric polymer a) has a Mooney viscosity ((ML 1+4) at 125° C.) of 20 to 90 MU; and
    the elastomeric polymer e) has a Mooney viscosity ((ML 1+4) at 125° C.) of less than 5 MU.

19. The vulcanizable rubber composition according to claim 18, wherein the elastomeric polymer a) comprises 1,1-disubstituted or 1,1,2-trisubstituted carbon-carbon double bonds, and has a Mooney viscosity ((ML 1+4) at 125° C.) of 20 to 50 MU.

20. The vulcanizable rubber composition according to claim 19, wherein:

the vulcanizable rubber composition is solid at 20° C. and comprises:

0.5 to 20 parts of the component b) per 100 parts of elastomer a), wherein component b) comprises at least one of octyl-phenol formaldehyde curing resins, and brominated phenolic resins;

0.25 to 10 parts of the component c) per 100 parts of elastomer a), wherein component c) comprises at least one of tin chloride, zinc chloride, aluminum chloride, zinc oxide, lead oxide, stannous oxide and halogenated polymers;

0.1 to 20 parts of the component d) per 100 parts elastomer, wherein component d) comprises a zeolite 5A having a moisture content of less than 1.5 wt % and a particle size of less than 50 micrometer;

0.1 to 100 parts of the component e) per 100 parts of elastomer a), wherein the polymer e) has an average weight molecular weight Mw of 5,000 to 80,000 g/mol; and the composition further comprises:

less than 0.01 part azodicorbonamid (ADCA) per 100 parts of the polymeric elastomer of compound a);

at most 100 parts of at least one additional polymer other than the elastomeric polymers a) and e), per 100 parts of elastomer a), wherein the at least one additional polymer is selected from the group consisting of polyethylene, polypropylene, acrylic polymer, polyvinyl chloride, ethylene-vinyl acetate copolymers, polyvinyl acetate, polyamide, polyester, chlorinated polyethylene, urethane polymers, styrene polymers, silicone polymers, and epoxy resins; and at least one of processing aids, fillers, softening agents other than the polymeric elastomer of compound e), additional cross-linkers other than component b), stabilizers, further polymers, and other auxiliaries.

* * * * *